(12) United States Patent
Sato et al.

(10) Patent No.: US 7,840,092 B2
(45) Date of Patent: Nov. 23, 2010

(54) MEDIUM PROCESSING METHOD, COPYING APPARATUS, AND DATA FILING APPARATUS

(75) Inventors: Yasuhiro Sato, Kanagawa (JP); Kunihisa Yamaguchi, Chiba (JP); Go Maruyama, Tokyo (JP); Hideo Hidai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1064 days.

(21) Appl. No.: 11/541,563

(22) Filed: Oct. 3, 2006

(65) Prior Publication Data

US 2007/0091373 A1 Apr. 26, 2007

(30) Foreign Application Priority Data

Oct. 20, 2005 (JP) ............... 2005-306199

(51) Int. Cl.
*G06K 9/32* (2006.01)
(52) U.S. Cl. .................. 382/294; 382/209; 382/282
(58) Field of Classification Search .......... 382/209, 382/219, 282, 284, 294
See application file for complete search history.

(56) References Cited

U.S. PATENT DOCUMENTS

| | | | | |
|---|---|---|---|---|
| 4,807,287 A | * | 2/1989 | Tucker et al. | ............ 713/179 |
| 5,410,611 A | * | 4/1995 | Huttenlocher et al. | ....... 382/177 |
| 5,745,664 A | | 4/1998 | Nomura et al. | |
| 6,345,130 B1 | * | 2/2002 | Dahl | .................... 382/286 |
| 6,801,905 B2 | * | 10/2004 | Andrei | ..................... 707/2 |

FOREIGN PATENT DOCUMENTS

| | | |
|---|---|---|
| JP | 5-110811 A | 4/1993 |
| JP | 5-292294 A | 11/1993 |
| JP | 7-143330 A | 6/1995 |
| JP | 7-184044 A | 7/1995 |
| JP | 2002-84386 A | 3/2002 |
| JP | 2002-176548 A | 6/2002 |

* cited by examiner

*Primary Examiner*—Yosef Kassa
(74) *Attorney, Agent, or Firm*—Dickstein Shapiro LLP (57) ABSTRACT

A medium processing method is provided that includes the steps of inputting images of a first medium and a second medium, recognizing first area information of the first medium and second area information of the second medium, determining a correspondence between the first area information and the second area information based on the recognition result, adjusting one of the first area information or the second area information based on the determined correspondence between the first area information and the second area information, and compositing the adjusted one of the area information within a predetermined area defined by the other one of the area information.

12 Claims, 11 Drawing Sheets

BIBLIOGRAPHIC INFORMATION WRITING AREA 34
31
ATTACHING AREA 33

32-1
SUPER MARKET
05 / 02 / 01
No.1
PRODUCT A  ¥100
PRODUCT B  ¥200
SUB TOTAL  ¥300
TAX        ¥15
SUM TOTAL  ¥315

32-2
PC SHOP
05 / 02 / 02
No.2
PRODUCT C  ¥1000
PRODUCT D  ¥2000
SUB TOTAL  ¥3000
TAX        ¥150
SUM TOTAL  ¥3150

32-3
RESTAURANT
05 / 02 / 03
No.1
PRODUCT E  ¥500
SUB TOTAL  ¥500
TAX        ¥2
SUM TOTAL  ¥525

32-4
GAS STAND
05 / 02 / 04
No.1
PRODUCT F  ¥105
AMOUNT     20 LITTERS
SUB TOTAL  ¥2100
TAX        ¥205
SUM TOTAL  ¥2205

FIG.12

BILL : NAME : SATO YASUHIRO, ID NO. × ×  31
BILLING DATE : 2005 / 3 / 1

| | | |
|---|---|---|
| SUPER MARKET | PRODUCT A | ¥100 |
| SUPER MARKET | PRODUCT B | ¥200 |
| PC SHOP | PRODUCT C | ¥1000 |
| PC SHOP | PRODUCT D | ¥2000 |
| RESTAURANT | PRODUCT E | ¥500 |
| GAS STAND | PRODUCT F | ¥2100 |
| SUB TOTAL | | ¥5900 |
| SUM TOTAL | | ¥6195 |

34

32-1
SUPER MARKET
05 / 02 / 01
No.1
PRODUCT A   ¥100
PRODUCT B   ¥200
SUB TOTAL   ¥300
TAX         ¥15
SUM TOTAL   ¥315

32-2
PC SHOP
05 / 02 / 02
No.2
PRODUCT C   ¥1000
PRODUCT D   ¥2000
SUB TOTAL   ¥3000
TAX         ¥150
SUM TOTAL   ¥3150

32-3
RESTAURANT
05 / 02 / 03
No.1
PRODUCT E   ¥500
SUB TOTAL   ¥500
TAX         ¥2
SUM TOTAL   ¥525

32-4 / 33
GAS STAND
05 / 02 / 04
No.1
PRODUCT F   ¥105
AMOUNT      20 LITTERS
SUB TOTAL   ¥2100
TAX         ¥205
SUM TOTAL   ¥2205

FIG.13

MEDIUM PROCESSING METHOD, COPYING APPARATUS, AND DATA FILING APPARATUS

BACKGROUND OF THE INVENTION

1. Field of the Invention

The present invention relates to a medium processing method for processing a medium such as paper, and a copying apparatus and a data filing apparatus implementing such a medium processing method.

2. Description of the Related Art

An electronic document may be created by a document creating application (e.g., word processor) that is run on a computer (e.g., personal computer (PC)) and is executed by the computer to input image data obtained by a digital camera or a scanner or digital contents provided over a website, for example, and use the input data as material for creating an electronic document. By operating the document creating application, characters may be input via a keyboard according to a suitable layout, the resolution and size of the input image data or digital contents may be suitably adjusted according to the layout, and/or relevant sections of the input image data or digital contents may be cut and inserted into the electronic document, for example. In one example, the resolution and size of the image data or digital contents may be adjusted by clicking and/or performing drag-and-drop operations using a mouse. In another example, numeric values may be directly input.

It is noted that the above-described operations may be performed under an environment where the electronic document, the image data, or digital contents are visually displayed as image information on a display device, and electronic data editing operations are performed on the displayed image information using a pointing device, for example.

Japanese Laid-Open Patent Publication No. 2002-176548 discloses a technique for extracting and designating the area of image data within a document by performing comparison processes with respect to a predetermined density range.

Japanese Laid-Open Patent Publication No. 7-184044 discloses a technique for detecting the area in which an image resides within a scanned image, and scaling the image according to an output document size.

Japanese Laid-Open Patent Publication No. 5-110811 discloses a technique for providing an area on a document into which area character or image information may be inserted, and overlaying information of a file from which the character or image information is called.

In the above-described examples of document creating applications, the size of image data or digital contents have to be adjusted through clicking and/or performing drag-and-drop operations with a mouse, or directly inputting numeric values using a keyboard, for example. In this case, editing operations may be quite burdensome.

SUMMARY OF THE INVENTION

According to an aspect of the present invention, a medium processing technique is provided to enable editing through simple operations.

According to an embodiment of the present invention, a medium processing method is provided that includes the steps of:

inputting images of a first medium and a second medium;

recognizing first area information of the first medium and second area information of the second medium;

determining a correspondence between the first area information and the second area information based on a recognition result of the recognizing step;

adjusting one of the first area information or the second area information based on the determined correspondence between the first area information and the second area information; and compositing the adjusted one of the first area information or the second area information within a predetermined area defined by the other one of the first area information or the second area information.

In one preferred embodiment, the medium processing method further includes the steps of:

recognizing first area identification information included in the first medium and recognizing second area identification information included in the second medium; and determining the correspondence between the first area information and the second area information based on the recognized first and second area identification information.

In another preferred embodiment of the present invention, the area identification information recognizing step includes recognizing at least one of a line color and a line width of line information included in the first area information and the second area information from the first medium and the second medium.

In another preferred embodiment of the present invention, the compositing step includes a step of erasing one of the first area information or the second area information and one of the first area identification information or the second area identification information.

In another preferred embodiment of the present invention, in a case where the first medium includes a text document with the first area information, and the second medium includes a photograph image with the second area information, the photograph image of the second medium is composited within an area defined by the first area information of the first medium.

In another preferred embodiment of the present invention, in a case where the first medium includes a text document without the first area information, and the second medium includes an image with the second area information, the text document of the first medium is composited within an area defined by the second area information of the second medium.

In another preferred embodiment, the medium processing method of the present invention further includes the steps of:

inputting a third medium including third area information; wherein an area defined by the first area information of the first medium and an area defined by the second area information of the second medium are composited on corresponding areas defined by the third area information of the third medium.

In another embodiment of the present invention, the medium processing method of the present invention further includes a step of:

determining whether the first medium and the second medium correspond to a compositing subject or a compositing object according to an order in which the first medium and the second medium are input.

According to another embodiment of the present invention, a medium processing method is provided that includes the steps of:

reading images of a form including area information and at least one paper slip;

recognizing the area information of the form from the image of the form;

recognizing an outer size of the paper slip from the image of the paper slip;

determining the number of paper slips read in the reading step and a relationship between the recognized outer size of the paper slip and the area information;

determining a scaling factor and a position for the image of the paper slip based on the determined number and relationship; and scaling the image of the paper slip and accommodating the scaled image within an area defined by the area information of the form based on the determined scaling factor and position.

In one preferred embodiment, the medium processing method of the present invention further includes the steps of:

performing character recognition on the image of the paper slip;

extracting contents of the paper slip based on a result of the character recognition; and outputting the extracted contents and a computation result of computing the extracted contents to an area of the form outside the area defined by the area information.

In another preferred embodiment the medium processing method of the present invention further includes the steps of:

extracting time/date information from the result of the character recognition; and determining an outputting order of the contents of the paper slip and a position of the image of the paper slip within the area defined by the area information based on the extracted time/date information.

According to another embodiment of the present invention, a medium processing method is provided that includes the steps of:

reading an image of a document that includes area information and address information indicating a location of an electronic file that is to be embedded within an area defined by the area information;

recognizing the area information and the address information from the image of the document;

referencing the electronic file based on the recognized address information and adjusting a size of the electronic file according to a size of the area information; and compositing the size-adjusted electronic file within the area defined by the area information of the document.

According to an aspect of the present invention, images of plural pieces of paper or electronic data that include area information may be read as image data, the area information of the images may be recognized through image recognition, and the images may be composited according to the image recognition results so that image editing may be performed through simple operations without requiring operations using a mouse or a keyboard, for example.

DESCRIPTION OF THE PREFERRED EMBODIMENTS

In the following, preferred embodiments of the present invention are described with reference to the accompanying drawings.

First Embodiment

First, a medium processing method according to a first embodiment of the present invention is described.

Figure 1:
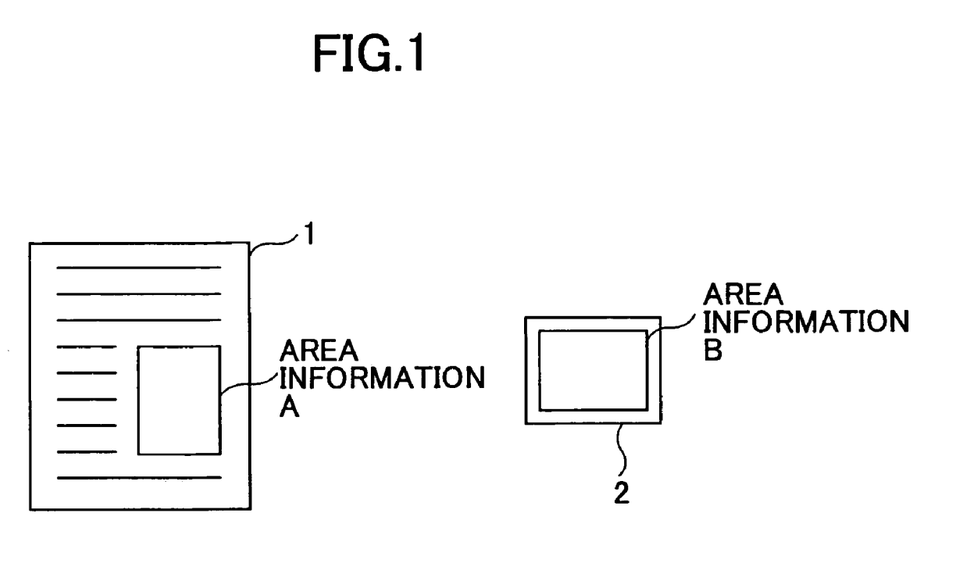
FIG. 1 is a diagram illustrating exemplary media used in a medium processing method according to a first embodiment of the present invention.

FIG. 1 is a diagram showing exemplary media that are used in the medium processing method according to the present embodiment.

In the medium processing method according to the present embodiment, image data of a first medium 1 and a second medium 2 are input to an image input unit.

The first medium 1 includes at least area information A, and the second medium includes at least area information B. The area information A and area information B may be any type of information such as color, line, dot, or outline of the medium that may be used to recognize and process input image data.

In the example of FIG. 1, the first medium 1 is a paper document having the area information A inserted within text information. The second medium 2 includes a frame area surrounding a photograph image and the information area B representing the photograph image area.

It is noted that in the present embodiment, the medium is assumed to be a physical object to be imaged such as a paper document or a photograph; however, the present invention is not limited to such examples, and at least one of the first medium 1 or the second medium 2 may take the form of electronic data, for example. Specifically, a medium according to an embodiment of the present invention may be paper, electronic information, or any other type of object to be imaged.

Electronic data of a medium may be an image data file, a file created by an application such as a word processor, or a file conforming to the hypertext format, for example. It is noted that the plural media subject to medium processing do not necessarily have to be provided at the same location as long as their relationship may be determined. For example, one medium may be provided on a server and the other medium may be available at hand as a paper document, and the data on the server may be accessed and referenced by communication means when the medium processing method is performed. In other examples, the medium data may be data stored in a PC, a PDA, a mobile phone, or some other personal device that is owned by an individual, and the medium data may be accessed when the medium processing method is performed.

Figure 2:
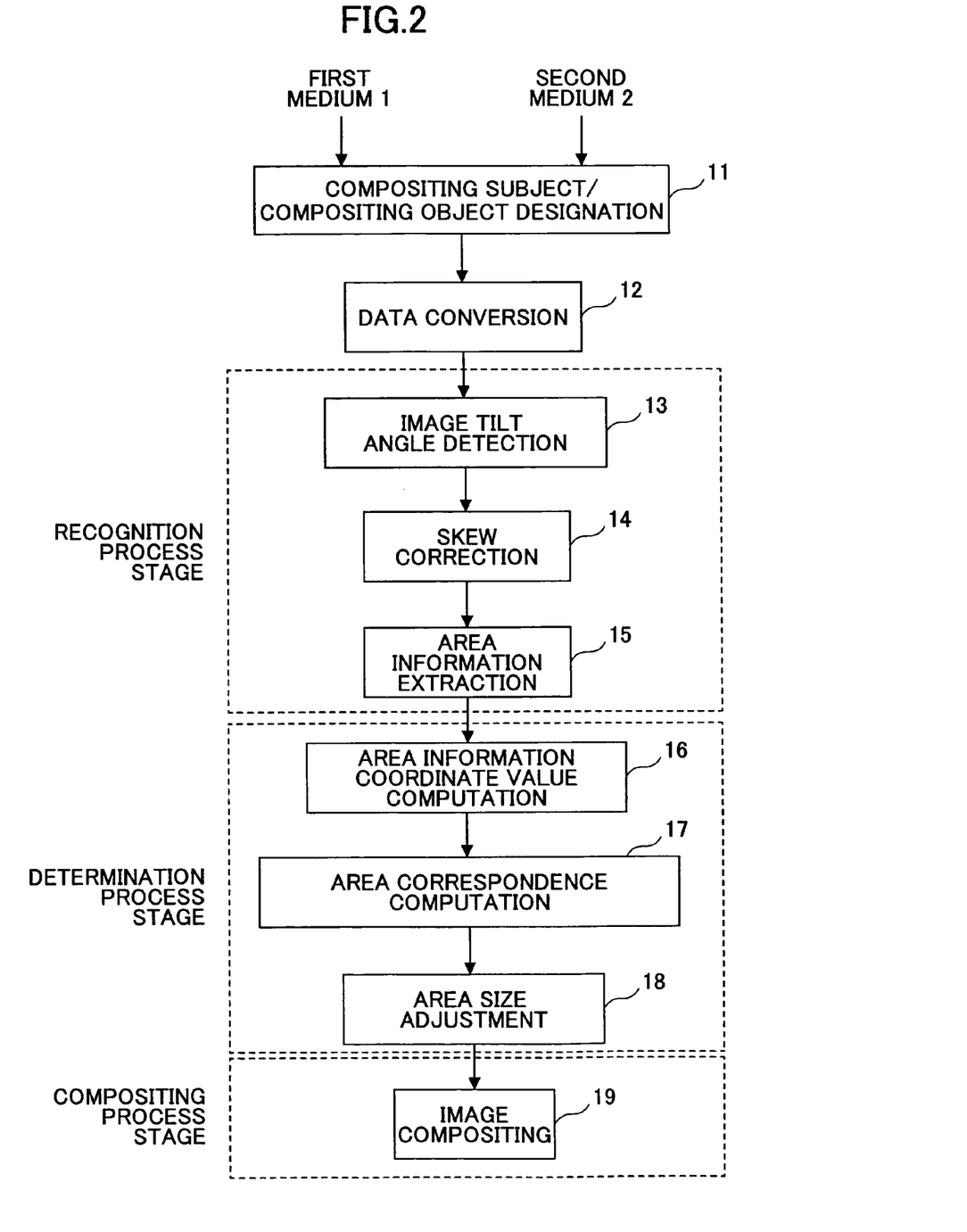
FIG. 2 is a flowchart illustrating processes of the medium processing method according the first embodiment.

FIG. 2 is a flowchart illustrating processes of the medium processing method according to the first embodiment.

As is shown in this drawing, when data of the first medium 1 and the second medium 2 are read and input by an image input apparatus such as a scanner or a digital camera, a designation process 11 is performed for designating whether the input medium data correspond to a compositing subject (i.e., medium data to be composited within data of another medium) or a compositing object (i.e., medium data into which data of another medium are to be composited), and the designation information is attached to the input data of the corresponding medium as attribute information.

Then, a data conversion process 12 is performed to convert the input media data into image data. Then, an image tilt angle detecting process 13 is performed on the image data, and acquired data on the image tilt angle are used to perform a skew correcting process 14 for correcting the tilting of the image corresponding to the image data.

For example, the tilt angle of an image may be detected by extracting the outline of the image and calculating the tilt angle of the outline, or calculating the tilt angle of text, a diagram area, a photograph area, or a line within the image. In one preferred embodiment, the type of the medium may be recognized and a suitable tilt angle detection method may be employed according to the medium type. After the skew correcting process 14 is performed, an area information extracting process 15 is performed for acquiring information pertaining to the area of the medium. Then, a coordinate value computing process 16 is performed for obtaining coordinate values of the corresponding area of the extracted area information.

Then, a correspondence computing process 17 is performed in which the sizes of the areas of the media are compared to obtain a size conversion coefficient (scaling factor), area center, or weighted center of the areas, for example.

Then, a size adjusting process 18 is performed by multiplying the area of the compositing subject by the size conversion coefficient after which an image compositing process 19 is performed in a manner such that the area centers and/or the weighted centers of the areas of the compositing subject and the compositing object may correspond, for example.

FIGS. 3A-3E are diagrams illustrating specific examples of the processes described above.

Figure 3A:
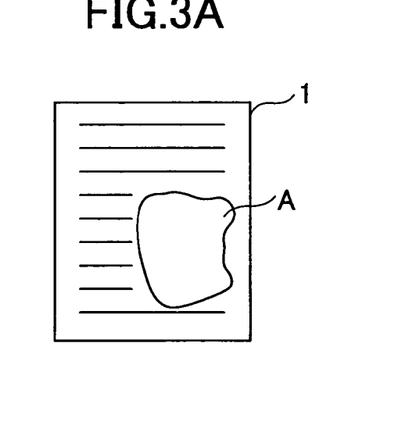
FIGS. 3A-3E are diagrams illustrating specific examples of the processes of the medium processing method according to the first embodiment.
Figure 3B:
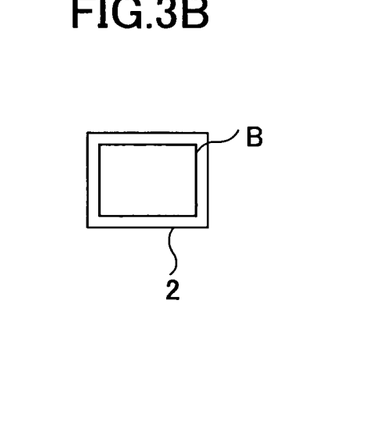

FIG. 3A shows a paper document as the first medium 1 with the area information A, FIG. 3B shows a photograph as the second medium 2 including a borderline as the area information B. It is noted that in the illustrated example of FIG. 3A, the area information A of the first medium 1 is a curved line surrounding an area. For example, the area information may be written by hand using a highlighter or a pen.

Figure 3C:
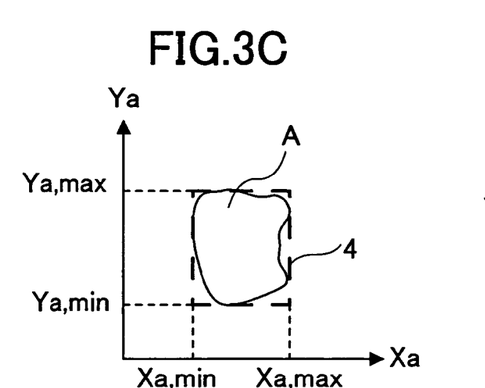

After the skew correcting process 14 (see FIG. 2) is performed on the first medium 1 shown in FIG. 3A, an area information extracting process 15 (see FIG. 2) is performed on the first medium 1. In this way, a circumscribed rectangle 4 surrounding the area information A of the first medium 1 may be derived, and maximum and minimum values on Xa-Ya coordinates (Xa, min; Xa, max; Ya, min; Ya, max) that define the positions of the sides of the circumscribed rectangle 4 are calculated as is shown in FIG. 3C.

Figure 3D:
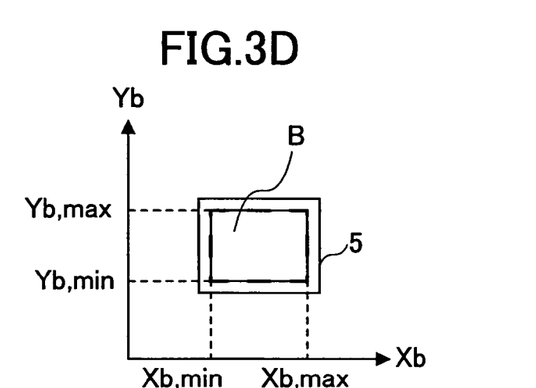

Similarly, the second medium 2 shown in FIG. 3B is processed to derive a circumscribed rectangle 5 surrounding the area information B (in this example, the area itself is a rectangle), and maximum and minimum values on Xb-Yb coordinates (Xb, min; Xb, max; Yb, min; Yb, max) that define the positions of the sides of the circumscribed rectangle 5 are calculated as is shown in FIG. 3D.

Figure 3E:
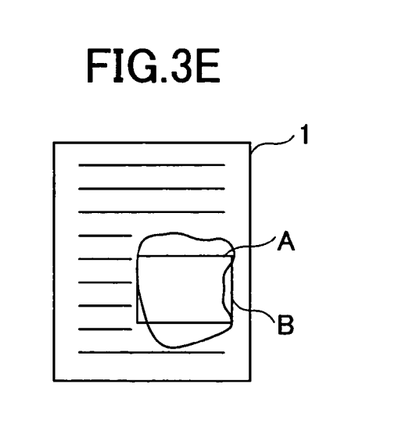

In the present embodiment, the first medium 1 corresponds to the medium on which image data are to be composited (compositing object), and the second medium 2 corresponds to the medium including image data that are to be composited on another medium (compositing subject). Accordingly, a size conversion coefficient (scaling factor) is calculated for accommodating the circumscribed rectangle 5 of the area information B of the second medium 2 within the circumscribed rectangle 4 of the area information A of the first medium 1, and the area information B is multiplied by the size conversion coefficient to be adjusted to a suitable size. Then, the scaled area information B is composited within the area information A of the first medium 1 so that a composite image as is illustrated in FIG. 3E may be generated.

As can be appreciated, according to the present embodiment, the area information A of the first medium 1 and the area information B of the second medium 2 are recognized, the correspondence between the area information A and B of the first and second media 1 and 2 (e.g., size, coordinates, etc.) is determined, and a composite image is obtained by accommodating the area of a designated one of the media into the area of the other one of the media.

Second Embodiment

In the following, a medium processing method according to a second embodiment of the present invention is described.

The second embodiment is concerned with an image processing technique for compositing images in a case where plural sets of area information exist in each medium. In one embodiment, when plural sets of area information exist in a medium, an identifier (ID) may be used for identifying each set of area information.

Figure 4A:
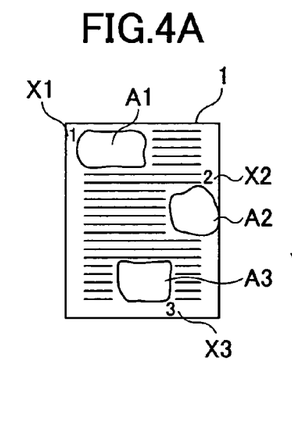
FIGS. 4A-4C are diagrams illustrating one specific example of a medium processing method according to a second embodiment of the present invention.
Figure 4B:
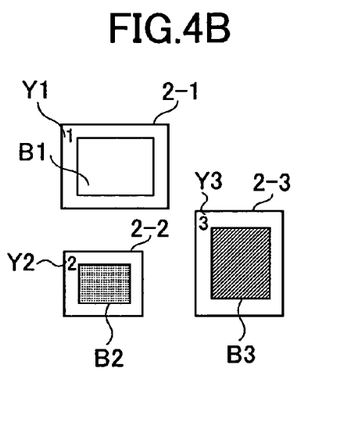

FIGS. 4A-4C are diagrams illustrating an example in which plural sets of area information provided in a medium are identified by numeric references. FIG. 4A shows a first medium 1 including area information A1, A2, and A3 that are respectively identified by area identification information X1, X2, and X3 in the form of numerical references (e.g., 1, 2, and 3). In the illustrated example, the area identification information X1, X2, and X3 are each positioned close to their corresponding area information A1, A2, and A3. In another example, the area identification information may be arranged within the corresponding area information. FIG. 4B shows plural compositing subjects as second media 2 including area information B1, B2, B3 that are respectively identified by identification information Y1, Y2, and Y3 in the form of numerical references. In the illustrated example, the second medium 2 correspond to photographs with borderlines as area information B1, B2, and B3 defining image areas, and the area identification information Y1, Y2, and Y3 are each arranged at the borderline margins in the form of numerical references.

Figure 4C:
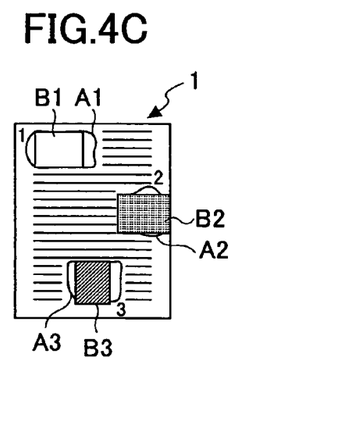

According to the second embodiment, each set of area information of the first medium 1 that is assigned area identification information is associated with corresponding area information of the second medium 2 after which processes described above in relation to FIGS. 2 and 3 are performed. In this way, a composite image as is shown in FIG. 4C may be output where the area information B1, B2, and B3 of the second medium 2 are composited on the area information A1, A2, and A3 of the first medium 1.

It is noted that in the above-illustrated example, numeric references are used as the area identification information; however, the present embodiment is not limited to the use of such numerical references and any type of information such as code/characters that may be recognized by an OCR (optical character reader) or an OMR (optical mark reader) may be used, for example.

Figure 5A:
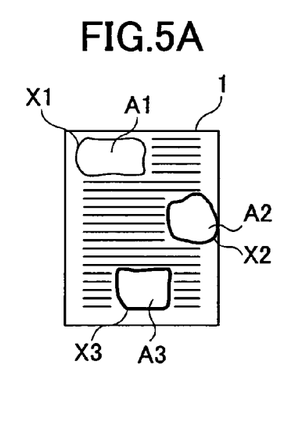
FIGS. 5A-5C are diagrams illustrating another specific example of the medium processing method according to the second embodiment.
Figure 5B:
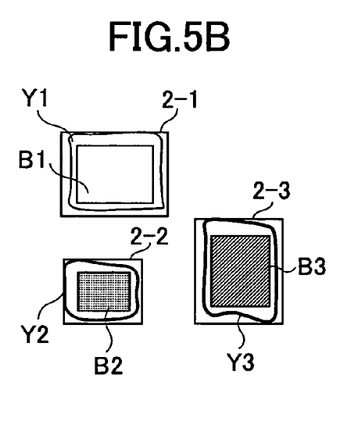
Figure 5C:
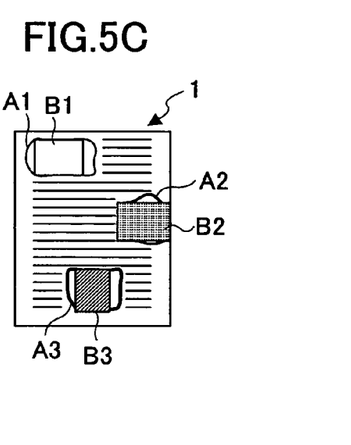

FIGS. 5A-5C illustrates another example in which area information A and B are identified by area identification information X and Y with differing line widths rather than using characters and codes as the area identification information.

In the illustrated example, area identification information X1, Y1, X2, Y2, X3, and Y3 in three different line widths are assigned to the area information A1, B1, A2, B2, A3, and B3 of the first and second media 1 and 2. It is noted that the line widths of the area identification information of the first medium 1 and the line widths of the area identification information of the second medium 2 do not necessarily have to match; however, at least the total number of differing line widths provided in the first medium 1 and the second medium 2 have to match so that the area information of the first medium 1 may be properly associated with the corresponding area information of the second medium 2 based on the relative width dimension order of the area identification information within each of the first medium 1 and the second medium 2, for example.

Figure 6A:
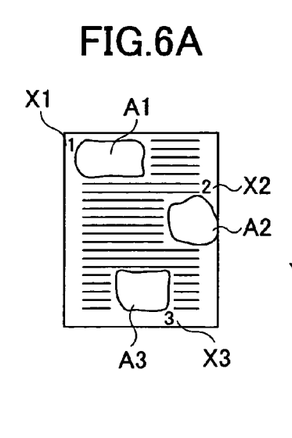
FIGS. 6A-6C are diagrams illustrating another specific example of the medium processing method according to the second embodiment.
Figure 6B:
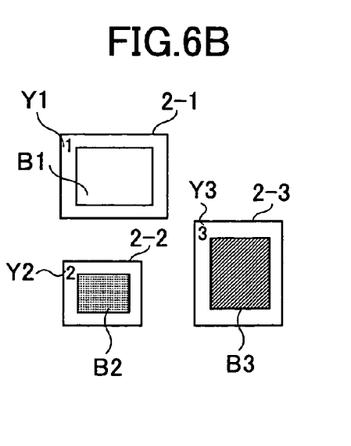
Figure 6C:
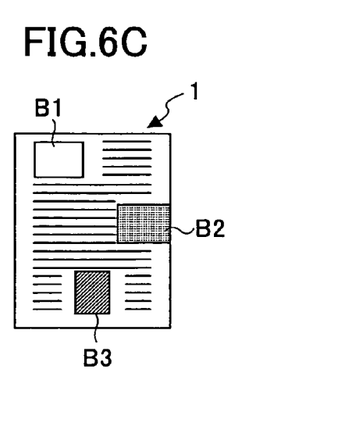

FIGS. 6A-6C illustrate another example in which the area information A1, A2, and A3 of the first medium 1 and their corresponding area identification information X1, X2, and X3 are erased upon compositing areas of the second media 2 shown in FIG. 6B on the first medium 1 shown in FIG. 6A. In this example, undesired information such as area information A1, A2, A3, and area identification information X1, X2, and X3 may be erased upon compositing the areas of the second media 2 on the first medium 1 so that a refined output image may be generated.

As can be appreciated from the above descriptions, according to the second embodiment, when media corresponding to the compositing object and the compositing subject each include plural areas, the areas of the media may be automatically associated with each other by assigning identification information such as handwritten numbers/figures or lines with differing widths or colors to the areas.

Also, it is noted that in a preferred embodiment, by erasing area information and area identification information during the image compositing process stage, noise components corresponding to undesired data components may be eliminated.

Third Embodiment

In the following, a medium processing method according to a third embodiment of the present invention is described.

Figure 7A:
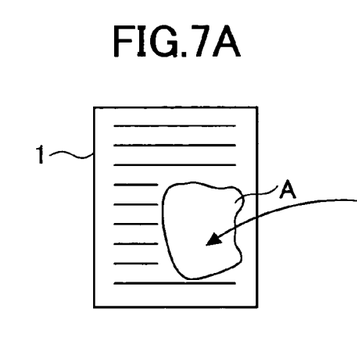
FIGS. 7A-7F are diagrams illustrating specific examples of a medium processing method according to a third embodiment of the present invention.
Figure 7B:
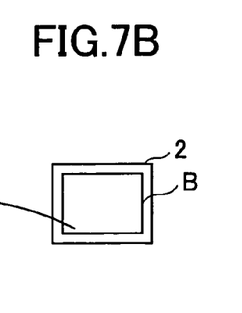
Figure 7C:
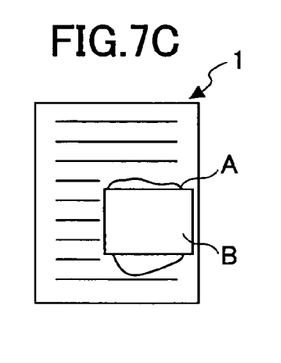

According to the third embodiment, in a case where the first medium 1 is a text document including area information A as is shown in FIG. 7A and the second medium 2 is a photograph image with a borderline as area information as is shown in FIG. 7B, the area information of the second medium 2 may be composited within the area information of the first medium 1.

Figure 7D:
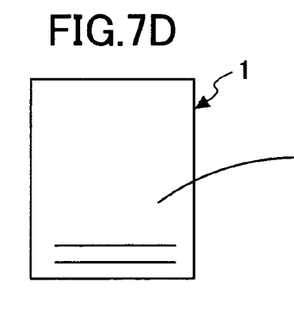
Figure 7E:
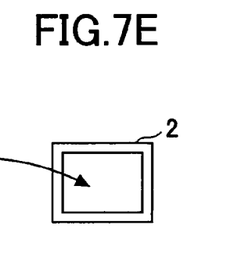
Figure 7F:
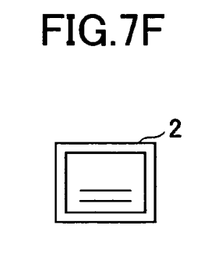

In a case where the first medium is a text document that does not include area information as is shown in FIG. 7D and the second medium 2 is a photograph or some other type of image with a border line as area information as is shown in FIG. 7E, the document image of the first medium 1 may be composited within the area information of the second medium 2 as is shown in FIG. 7F. In this way, text information of the first medium 1 may be arranged to overlap with the photograph image or some other type of image of the second medium. For example, comments or handwritten information may be composited on a photograph image.

Figure 8:
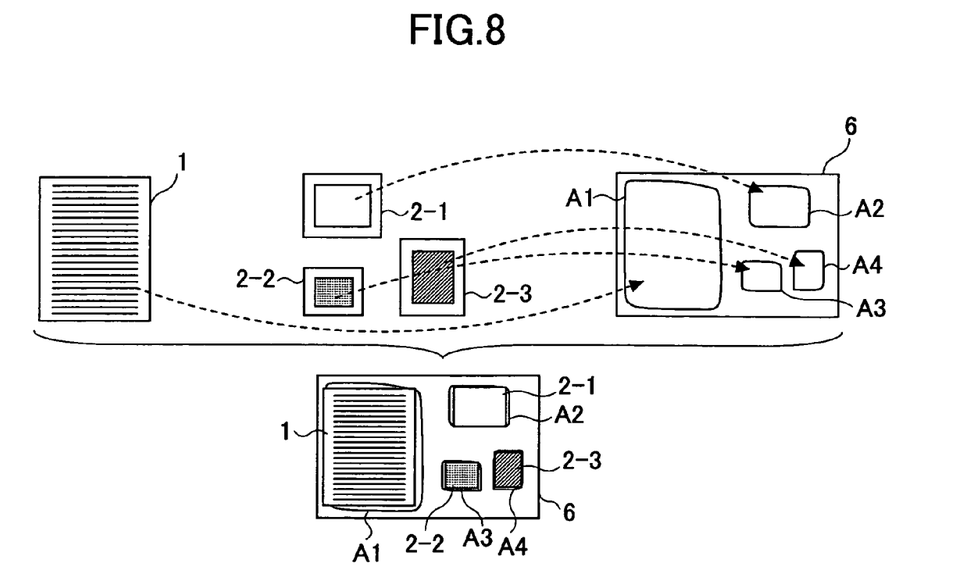
FIG. 8 is a diagram illustrating another specific example of the medium processing method according to the third embodiment.

FIG. 8 illustrates another example in which a third medium 6 is provided in addition to a first medium 1 and plural second media 2-1, 2-2, and 2-3. In this example, the first medium 1 and the area information of the second media 2-1, 2-2, and 2-3 are composited on the area information of the third medium.

In the following, processes of the medium processing method according to the third embodiment are described with reference to the flowchart shown in FIG. 9. It is noted that in FIG. 9, processes that are identical to those described in relation to FIG. 2 are given the same numerical references and their descriptions are omitted.

Figure 9:
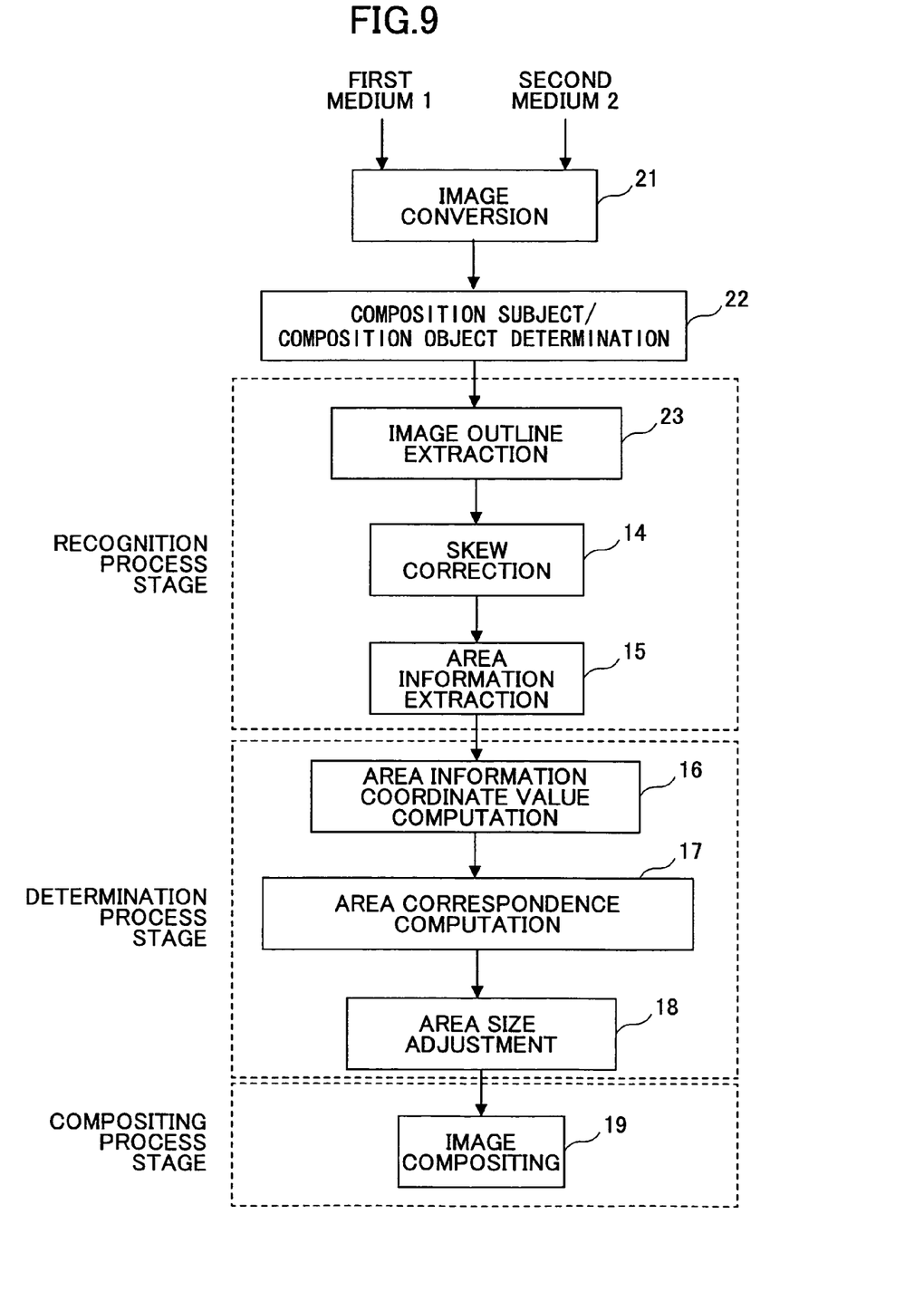
FIG. 9 is a flowchart illustrating processes of the medium processing method according to the third embodiment.

In FIG. 9, data of the first medium 1 and the second medium 2 are read and an image conversion process 21 is performed for converting the read data into image data. It is noted that in this process, the order in which the media 1 and 2 are read is recorded so that a determination process 22 may be performed to determine whether a medium corresponds to a compositing object or a compositing subject based on the order in which the media is read. Then, the process moves on to recognition, determination, and compositing process stages as is described below.

In the recognition process stage, an outline extracting process 23 is performed with respect to each image, and the acquired data pertaining to the image outlines are used to perform a skew correction process 24 to correct image tilting of the images.

Then, the area information extracting process 15 is performed in the manner described above to extract area information of the medium. Then, based on the extracted area information, the coordinate value computing process 16 is performed for obtaining coordinate values for the area information. Then, the correspondence computing process 17 is performed in which the areas of the media 1 and 2 are compared to obtain a size conversion coefficient (scaling factor), the area center, and the weighted center, for example. Then, the size adjusting process 18 is performed by multiplying the area of the compositing subject by the size conversion coefficient, and an image compositing process is performed in a manner such that the area centers and the weighted centers of the areas of the media 1 and 2 may correspond.

As is described above, according to the third embodiment, a text document with area information and a photograph may be read and the image of the photograph may be adjusted to an appropriate size to be accommodated within the area defined by the area information of the text document to produce a document with a composited image. Alternatively, text document without area information and a photograph may be read, and the text may be composited on the photograph to produce a photograph with inserted text or characters such as a post card.

In one embodiment, area information of a first media and a second media may be composited with areas of a third media.

Also, by determining whether an input medium corresponds to a compositing subject or a compositing object based on the order in which a medium is input, image compositing may be performed through simple procedures.

Fourth Embodiment

In the following, a medium processing method according to a fourth embodiment of the present invention is described.

Figure 10A:
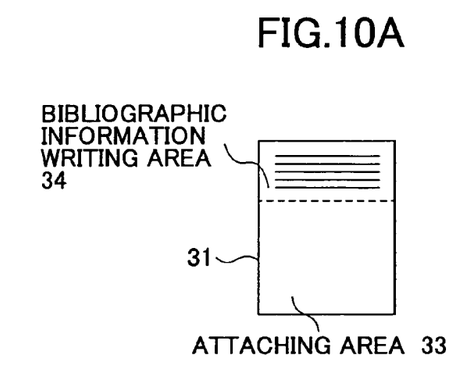
FIGS. 10A-10C are diagrams illustrating an example of a medium processing method according to a fourth embodiment of the present invention.

FIG. 10A shows a form 31 as a first medium to which a paper slip such as a receipt may be attached. The form 31 includes an attaching area 33 and a bibliographic information writing area 34.

Figure 10B:
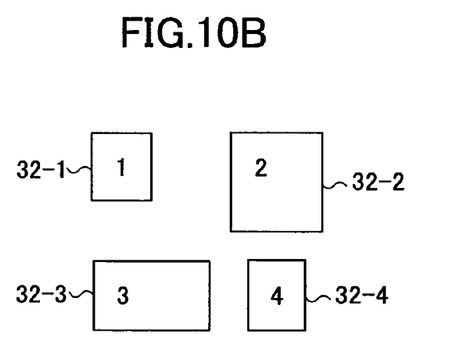

FIG. 10B shows receipts 32-1 through 32-4 of non-uniform sizes as second media.

In the present embodiment, the form 31, and the receipts 32-1 through 32-4 are converted into image data, and the attaching area 33 of the form 31 is recognized by image recognition means. Also, paper edges as area information of the receipts 32-1 through 32-4 are detected. Then, the size of the areas of the receipts 32-1 through 32-4 and the size of the attaching area 33 of the form 31 are compared, and a scaling factor is calculated for accommodating the images of the receipts 32-1 through 32-4 within the attaching area 33 of the form 31. Then, the images of the receipts 32-1 through 32-4 are scaled according to the scaling factor, and the scaled images are electronically composited on the attaching area 33 of the form 31.

Figure 10C:
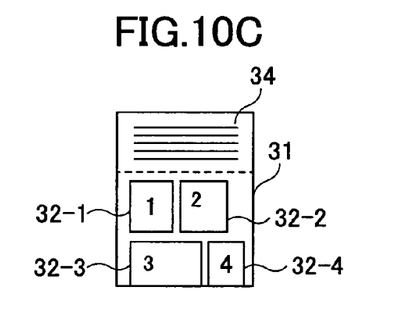

As is described, by attaching the receipts 32-1 through 32-4 electronically as is shown in FIG. 10C, an electronic document formatted as business accounting data for management may be crated automatically.

Figure 11:
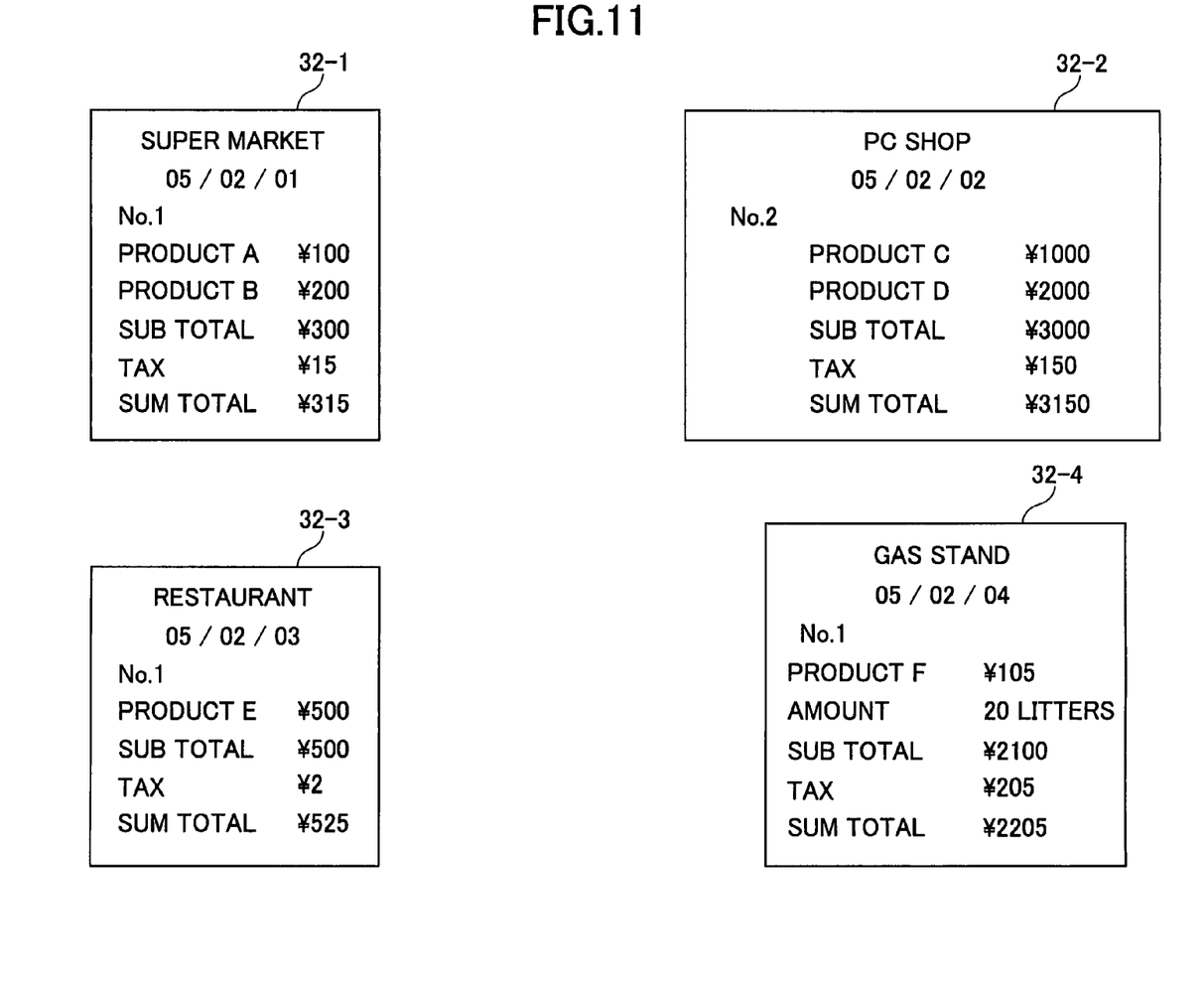
FIG. 11 is a diagram illustrating exemplary second media used in the medium processing method according to the fourth embodiment.
Figure 12:
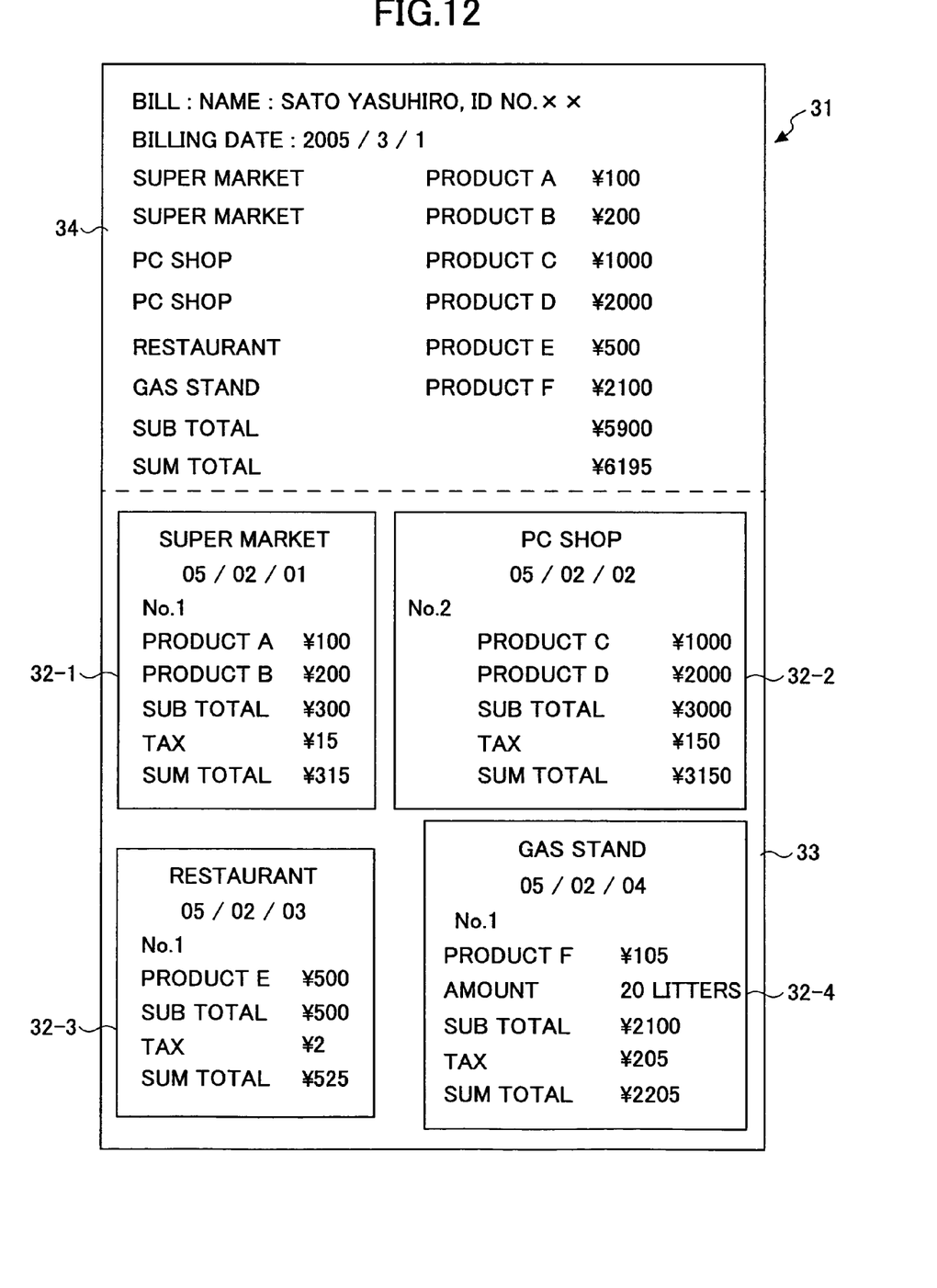
FIG. 12 is a diagram illustrating an example of a bill obtained by performing the medium processing method according to the fourth embodiment.

For example, when the medium processing method according to the present embodiment is performed on receipts 32-1 through 32-4 as second media as is shown in FIG. 11, the images of the receipts 32-1 through 32-4 may be scaled and electronically composited on the receipt attaching area 33 of a bill (form) 31 to obtain a composited image as is shown in FIG. 12. It is noted that in electronically processing the receipts 32-1 through 32-4, optical character recognition (OCR) may be performed on the information written in the receipt so that the written items of information such as store name, time/date, product name, price, sub total, and sum total may be recognized and listed in the bibliographic information writing area 34. In this way, for example, the total billing cost generated from all the attached receipts may be automatically calculated and output. In another example, the time/date information may be extracted from the OCR-processed receipts so that image data and bibliographic information of the receipts may be rearranged in chronological order based on the recognized time/date information.

According to the fourth embodiment, area information of a form for attaching receipts is recognized, and information written on the receipts is read and composited within a predetermined area of the form. In this case, the size and layout of the receipt information to be composited may be adjusted according to the number and size of the receipts.

Also, in one embodiment, specific contents of the receipt may be extracted and recognized through character recognition so that information items such as product name and total charge may be extracted and the extracted information items as well as computed results (e.g., total cost of the attached receipts) obtained by computing the extracted information may be output to a predetermined area of the form, for example. In this way, a bill may be automatically generated.

In another embodiment, time/date information may be extracted from the contents of the receipts, and the order in which the receipts are attached and/or the order in which specific information items are arranged may be determined based on the extracted time/date information so that an organized bill may be generated.

Fifth Embodiment

In the following a medium processing method according to a fifth embodiment of the present invention is described.

The fifth embodiment is concerned with a case where the second medium corresponds to electronic data provided at a location that may be electronically accessed.

Figure 13:
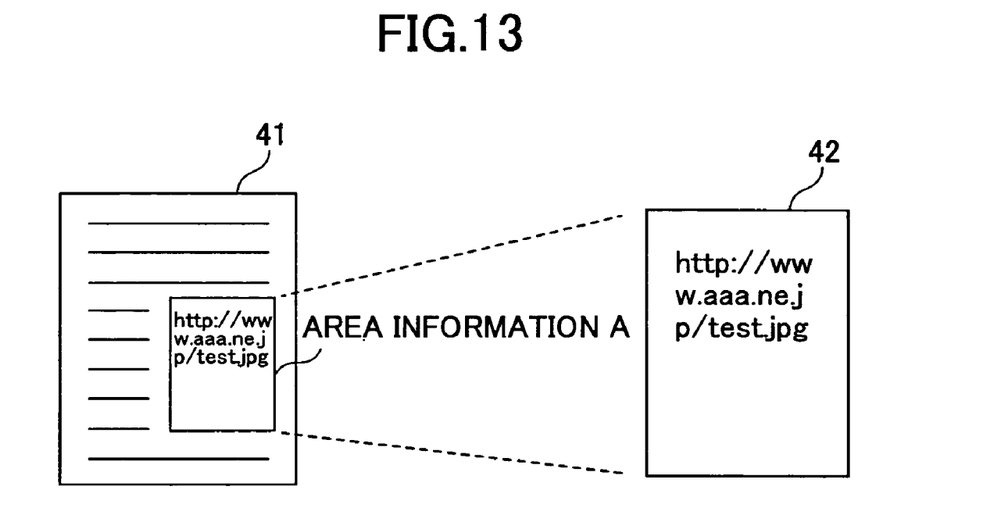
FIG. 13 is a diagram illustrating a specific example of a medium processing method according to a fifth embodiment of the present invention.

For example, a first medium 41 may be a document including area information A as is shown in FIG. 13, the area information A including at least information on the location of the electronic data of a second medium 42 (In the illustrated example, a URL "http://www.aaa.ne.jp/test.jpg" is indicated).

In this case, by reading and obtaining image data of the first medium 41, extracting the information on the location of the second medium 42 from the area information A, and performing an OCR process thereon, data to be embedded into the area information A may be referenced. The referenced data may then be scaled based on its attribute information (e.g., image size) so that the data may be properly accommodated within the information area A. Then, the scaled data may be superposed on the area information A of the first medium 41.

In the illustrated example of FIG. 13, information on the location of the second medium 42 is written in a relatively large space of the area information A. Thus, when superposing the second medium 42 on the area information A, the location information may intrude superposition of the second medium 42, for example. Therefore, the location information is preferably arranged at the periphery of the area information A to avoid interference with other information to be embedded therein. In another example, the location information may be recognized and then erased when superposing data on the area information A to generate a composite image. Also, it is noted that in the illustrated example, a URL is used as the location information; however, the present embodiment is not limited to such an example and other types of location information such as an IP address, a local address, and an absolute or relative path of a network PC may be used as well.

As can be appreciated from the above descriptions, according to the fifth embodiment, address information indicating the location of an electronic file that is to be composited within an area of a medium may be written on the medium, and the address information may be read as an image and recognized so that the corresponding electronic file may be accessed based on the recognized address information. Then, the electronic file may be scaled to be properly accommodated within the area of the medium to thereby produce a composite image.

It is noted that by applying the medium processing techniques according to embodiments of the present invention to an imaging apparatus such as a copying apparatus or a data filing apparatus, and inputting paper or electronic data including area information as the first medium and the second medium, edited paper or electronic data representing a composite image of the first and second media may be output, for example.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2005-306199 filed on Oct. 20, 2005, the entire contents of which are hereby incorporated by reference.

What is claimed is:

1. A computer readable medium encoded with instructions for causing a computer to perform the steps of:
   receiving images of a first medium and a second medium;
   recognizing first area information of the first medium and second area information of the second medium;
   determining a correspondence between the first area information and the second area information based on a recognition result of the recognizing step;
   adjusting one of the first area information or the second area information based on the determined correspondence between the first area information and the second area information; and
   compositing the adjusted one of the first area information or the second area information within a predetermined area defined by the other one of the first area information or the second area information.

2. The computer readable medium claimed in claim 1, further comprising instructions for causing a computer to perform the steps of:
   recognizing first area identification information included in the first medium and recognizing second area identification information included in the second medium; and
   determining the correspondence between the first area information and the second area information based on the recognized first and second area identification information.

3. The computer readable medium as claimed in claim 2, wherein
   the area identification information recognizing step includes recognizing at least one of a line color and a line width of line information included in the first area information and the second area information from the first medium and the second medium.

4. The computer readable medium as claimed in claim 1, wherein
   the compositing step includes a step of erasing one of the first area information or the second area information and one of the first area identification information or the second area identification information.

5. The computer readable medium as claimed in claim 1, wherein
   in a case where the first medium includes a text document with the first area information, and the second medium includes a photograph image with the second area information, the photograph image of the second medium is composited within an area defined by the first area information of the first medium.

6. The computer readable medium as claimed in claim 1, wherein
   in a case where the first medium includes a text document without the first area information, and the second medium includes an image with the second area information, the text document of the first medium is composited within an area defined by the second area information of the second medium.

7. The computer readable medium as claimed in claim 1, further comprising instructions for causing a computer to perform the steps of:
   receiving a third medium including third area information; wherein
   an area defined by the first area information of the first medium and an area defined by the second area information of the second medium are composited on corresponding areas defined by the third area information of the third medium.

8. The computer readable medium as claimed in claim 1, further comprising instructions for causing a computer to perform a step of:
   determining whether the first medium and the second medium correspond to a compositing subject or a compositing object according to an order in which the first medium and the second medium are input.

9. A computer readable medium encoded with instructions for causing a computer to perform the steps of:
   reading images of a form including area information and at least one paper slip;
   recognizing the area information of the form from the image of the form;
   recognizing an outer size of the paper slip from the image of the paper slip;
   determining a number of the paper slip read in the reading step and a relationship between the recognized outer size of the paper slip and the area information;
   determining a scaling factor and a position for the image of the paper slip based on the determined number and relationship; and
   scaling the image of the paper slip and accommodating the scaled image within an area defined by the area information of the form based on the determined scaling factor and position.

10. The computer readable medium as claimed in claim 9, further comprising instructions for performing the steps of:
    performing character recognition on the image of the paper slip;
    extracting contents of the paper slip based on a result of the character recognition; and
    outputting the extracted contents and a computation result of computing the extracted contents to an area of the form outside the area defined by the area information.

11. The computer readable medium as claimed in claim 10, further comprising instructions for causing a computer to perform the steps of:
    extracting time/date information from the result of the character recognition; and
    determining an outputting order of the contents of the paper slip and a position of the image of the paper slip within the area defined by the area information based on the extracted time/date information.

12. A computer readable medium encoded with instructions for causing a computer to perform comprising the steps of:
    reading an image of a document that includes area information and address information indicating a location of an electronic file that is to be embedded within an area defined by the area information;
    recognizing the area information and the address information from the image of the document;
    referencing the electronic file based on the recognized address information and adjusting a size of the electronic file according to a size of the area information; and
    compositing the size-adjusted electronic file within the area defined by the area information of the document.

* * * * *